(12) United States Patent
Morishima et al.

(10) Patent No.: US 8,253,306 B2
(45) Date of Patent: Aug. 28, 2012

(54) INERTIAL DRIVE ACTUATOR CONFIGURED TO PROVIDE ARBITRARY MOTION IN AN X-Y PLANE

(75) Inventors: Tetsuya Morishima, Hachioji (JP); You Kondoh, Yamato (JP)

(73) Assignee: Olympus Corporation, Tokyo (JP)

( * ) Notice: Subject to any disclaimer, the term of this patent is extended or adjusted under 35 U.S.C. 154(b) by 388 days.

(21) Appl. No.: 12/479,108

(22) Filed: Jun. 5, 2009

(65) Prior Publication Data
US 2009/0302710 A1 Dec. 10, 2009

(30) Foreign Application Priority Data

Jun. 5, 2008 (JP) ................................. 2008-148014

(51) Int. Cl.
*H01L 41/08* (2006.01)
(52) U.S. Cl. ................................. 310/329; 310/323.02
(58) Field of Classification Search .................. 310/323, 310/329
See application file for complete search history.

(56) References Cited

U.S. PATENT DOCUMENTS

| | | | | |
|---|---|---|---|---|
| 4,835,435 | A * | 5/1989 | Yeung et al. ................... | 310/324 |
| 5,786,654 | A | 7/1998 | Yoshida et al. | |
| 6,949,868 | B2 * | 9/2005 | Iseki ........................ | 310/323.02 |
| 7,196,454 | B2 * | 3/2007 | Baur et al. ................ | 310/323.01 |
| 7,462,975 | B2 * | 12/2008 | Matsuki ..................... | 310/323.02 |
| 7,535,661 | B2 * | 5/2009 | Matsuki ........................ | 359/811 |
| 7,671,512 | B2 * | 3/2010 | Yasunaga ................... | 310/323.02 |
| 7,737,606 | B2 * | 6/2010 | Matsuki ..................... | 310/323.09 |
| 7,738,210 | B2 * | 6/2010 | Matsuki ......................... | 360/71 |
| 2007/0241640 | A1 * | 10/2007 | Matsuki ................... | 310/323.01 |

FOREIGN PATENT DOCUMENTS

| | | | |
|---|---|---|---|
| JP | 03206994 A | * | 9/1991 |
| JP | 04177214 A | * | 6/1992 |
| JP | 08-340682 | | 12/1996 |

* cited by examiner

*Primary Examiner* — Jaydi San Martin
(74) *Attorney, Agent, or Firm* — Scully, Scott, Murphy & Presser, P.C.

(57) ABSTRACT

An inertial drive actuator includes a fixed member, a displacement generating mechanism of which, one end is adjacent to the fixed member, and a displacement is generated at the other end thereof, a driving mechanism which applies a voltage for displacing the displacement generating mechanism, a vibration substrate which is connected to the other end of the displacement generating mechanism, and which is displaceable in a direction of displacement, a mobile object which is disposed to be facing a vibration substrate electrode provided to the vibration substrate, and which moves with respect to the vibration substrate by an inertia, and a friction controlling mechanism which changes a frictional force between the mobile object and the vibration substrate. A regulating member which regulates the movement of the mobile object is provided to at least one of the fixed member and the vibration substrate such that the mobile object moves in a direction of displacement of the vibration substrate or in a direction other than the direction of displacement.

9 Claims, 11 Drawing Sheets

PRIOR ART

INERTIAL DRIVE ACTUATOR CONFIGURED TO PROVIDE ARBITRARY MOTION IN AN X-Y PLANE

CROSS-REFERENCE TO RELATED APPLICATION

The present application is based upon and claims the benefit of priority from the prior Japanese Patent Application No. 2008-148014 filed on Jun. 5, 2008; the entire contents of which are incorporated herein by reference.

BACKGROUND OF THE INVENTION

1. Field of the Invention

The present invention relates to an inertial drive actuator.

2. Description of the Related Art

Figure 11:
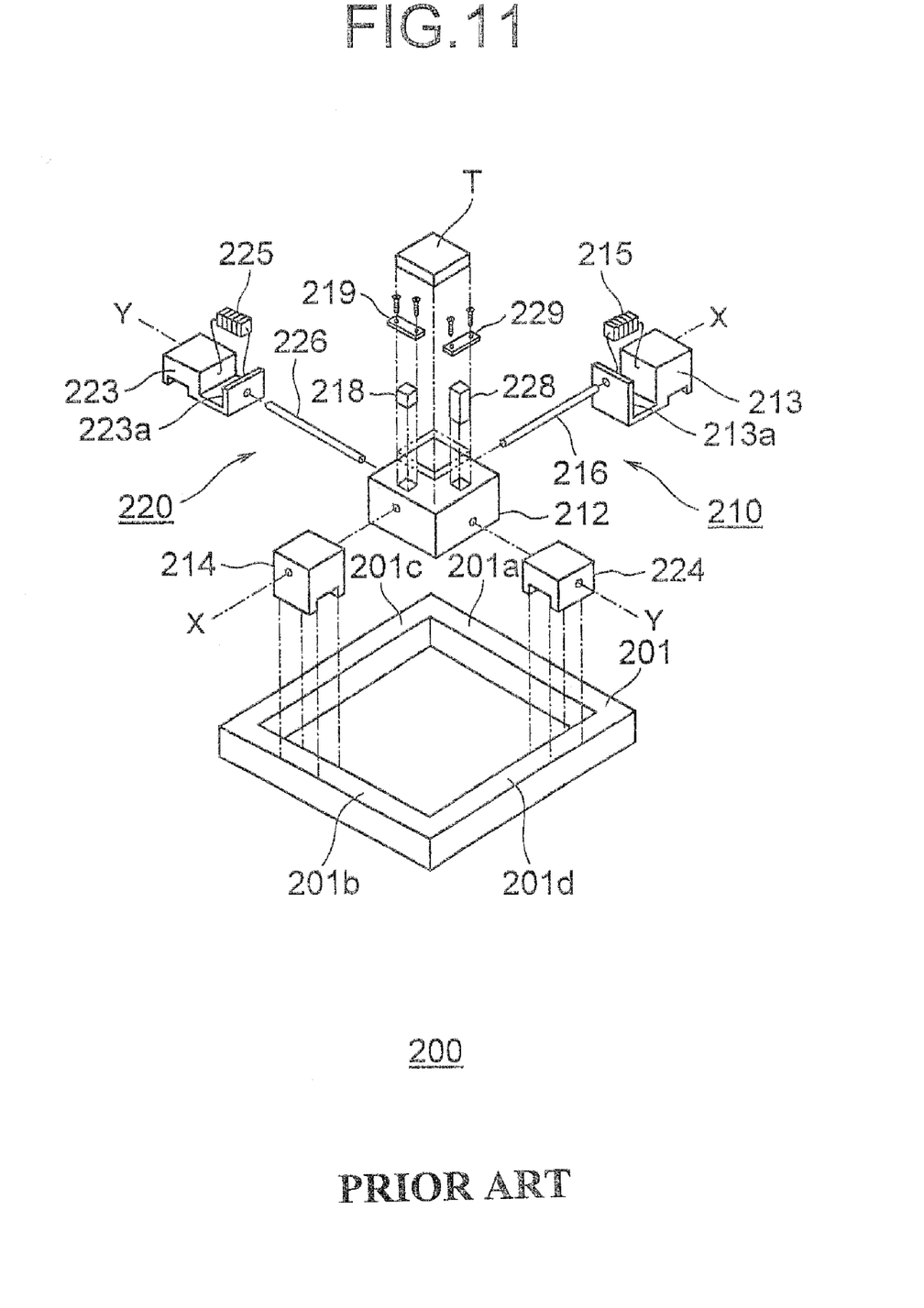
FIG. 11 is an exploded perspective view showing a structure of a conventional actuator.

As a conventional example of an actuator in which, a movement of an object is made possible by a driving mechanism in which, an electromechanical transducer is used, a mobile table 200 described in Japanese Patent Application Laid-open Publication No. Hei 8-340682 is available. The mobile table 200 will be described below by referring to FIG. 11. FIG. 11 is an exploded perspective view showing a structure of a conventional actuator.

The mobile table 200 includes an actuator 210 in X-axis direction and an actuator 220 in Y-axis direction. The actuator 210 in X-axis direction includes supporting blocks 213 and 214 which are slidably fitted without any slackness on members 201a and 201b respectively of a frame 201, a piezoelectric element 215, a drive shaft 216, a slider block 212, a pad 218, and a plate spring 219. The drive shaft 216 is supported to move freely in an axial direction by a bearing 213a and the supporting block 213 which are formed integrally with the supporting block 214. Moreover, one end of the piezoelectric element 215 is fixed by adhering to the supporting block 213, and the other end thereof is fixed by adhering to one end of the drive shaft 216. The drive shaft 216 is displaceable in X-axis direction by a displacement of the piezoelectric element 215 in a direction of thickness.

Moreover, the actuator 220 in Y-axis direction includes supporting blocks 223 and 224 which are slidably fitted without any slackness on members 201c and 201d respectively of the frame 201, a piezoelectric element 225, a drive shaft 226, the slider block 212, a pad 228, and a plate spring 229. The drive shaft 226 is supported to move freely in an axial direction by a bearing 223a and the supporting block 224 which are formed integrally with the supporting block 223. Moreover, one end of the piezoelectric element 225 is fixed by adhering to the supporting block 223, and the other end thereof is fixed by adhering to one end of the drive shaft 226. The drive shaft 226 is displaceable in Y-axis direction by a displacement of the piezoelectric element 225 in a direction of thickness. In the abovementioned structure, by driving the piezoelectric element 215 or the piezoelectric element 225, the slider block 212 is displaced via the drive shaft 216 or the drive shaft 226, and accordingly, a table T disposed on the slider block 212 is moved in X-axis direction and Y-axis direction.

However, in the mobile table 200 in FIG. 11, since the slider block 212 does not move except in a direction of elongation and contraction of the piezoelectric elements 215 and 225, for moving in an arbitrary direction in XY plane, the structure has to be made complicated. Moreover, for moving in a desired trajectory, a sophisticated (a high degree) position detecting mechanism is necessary, and lowering the cost has been difficult.

SUMMARY OF THE INVENTION

The present invention is made in view of the abovementioned circumstances and an object of the present invention is to provide an inertial drive actuator in which, it is possible to move a mobile object in a desired direction on XY plane without complicating the structure. Moreover, an object of the present invention is to provide an inertial drive actuator in which, it is possible to move the mobile object in a desired trajectory.

To solve the abovementioned issues and to achieve the object, according to the present invention, there can be provided an inertial drive actuator including a fixed member, a displacement generating mechanism of which, one end is adjacent to the fixed member, and a displacement is generated at the other end thereof, a driving mechanism which applies a voltage for displacing the displacement generating mechanism, a vibration substrate which is connected to the other end of the displacement generating mechanism, and which is displaceable in a direction of displacement, a mobile object which his disposed to be facing the vibration substrate, and which moves with respect to the vibration substrate by an inertia, and a friction controlling mechanism which changes a frictional force between the mobile object and the vibration substrate, and a regulating member which regulates the movement of the mobile object is provided to at least one of the fixed member and the vibration substrate such that the mobile object moves in a direction of displacement of the vibration substrate or in a direction other than the direction of displacement.

In the inertial drive actuator according to the present invention, it is preferable that the vibration substrate has a vibration substrate electrode, and the mobile object has a mobile object electrode at a position facing the vibration substrate electrode, and an insulating layer is disposed between the vibration substrate electrode and the mobile object electrode, and the friction controlling mechanism generates an electric potential difference between the mobile object electrode and the vibration substrate electrode, and changes the frictional force between the vibration substrate and the mobile object by an electrostatic force of attraction based on the electric potential difference.

In the inertial drive actuator according to the present invention, it is preferable that the regulating member is provided leaving a space mutually, and the mobile object is arranged between the regulating members, and the mobile object moves along the regulating member.

In the inertial drive actuator according to the present invention, the mobile object can be rotated by a frictional force with the regulating member and a displacement of the vibration substrate.

In the inertial drive actuator according to the present invention, the mobile object may be formed of an electroconductive material.

It is preferable that the inertial drive actuator according to the present invention may further include a permanent magnet which is disposed on the vibration substrate, on a side opposite to the mobile object, and that the mobile object is formed of a magnetic material.

In the inertial drive actuator according to the present invention, it is preferable that the mobile objects are in plurality, and it is possible to control the plurality of mobile objects independently.

DETAILED DESCRIPTION OF THE INVENTION

Exemplary embodiments of an inertial drive actuator according to the present invention will be described below in detail by referring to the accompanying diagrams. However, the present invention is not restricted to the embodiments described below.
(First Embodiment)

An inertial drive actuator 10 according to a first embodiment of the present invention will be described below while referring to diagrams from FIG. 1A to FIG. 3C. Here, FIG. 1A to FIG. 1C are diagrams showing a structure of the inertial drive actuator 10 according to the first embodiment, where FIG. 1A is a plan view, FIG. 1B is a cross-sectional view taken along a line IB-IB in FIG. 1A, and FIG. 1C is a partially enlarged view of a mobile object 31 and a vibration substrate 12 in FIG. 1A.

Figure 1A:
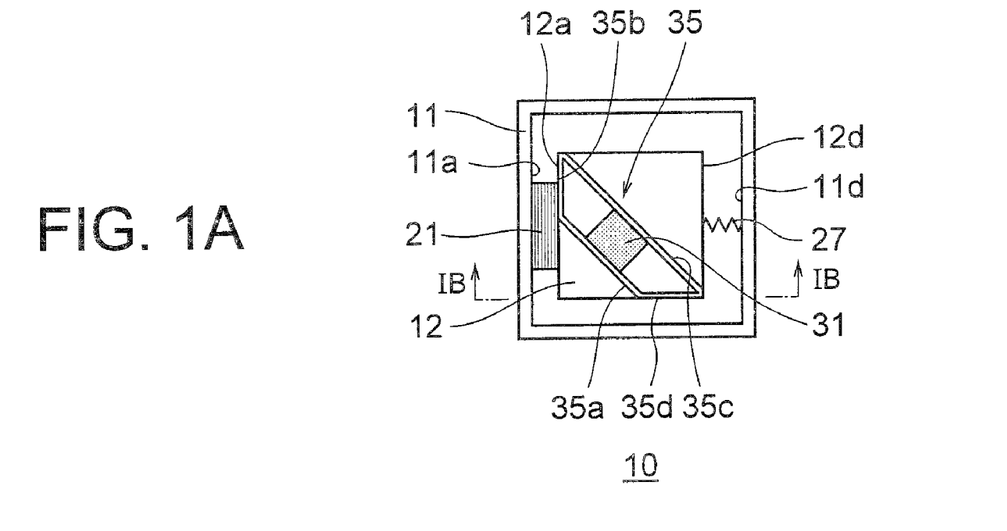
FIG. 1A is a plan view showing a structure of an inertial drive actuator according to a first embodiment of the present invention.
Figure 1B:
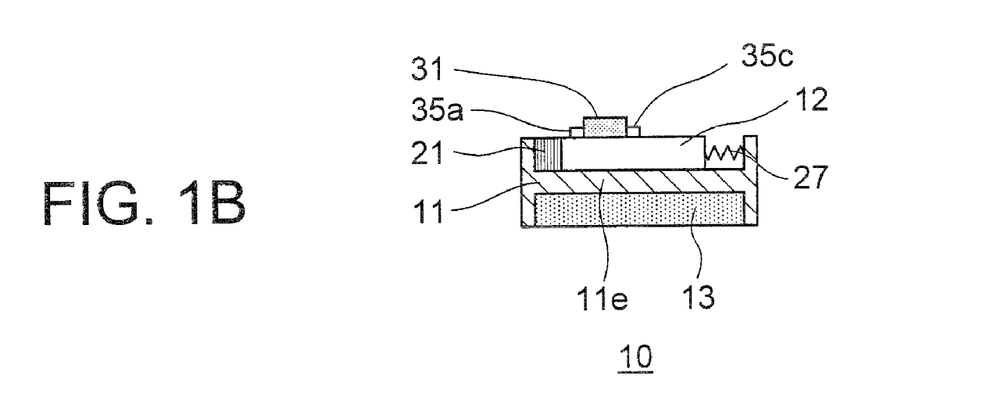
FIG. 1B is a cross-sectional view taken along a line IB-IB in FIG. 1A.
Figure 1C:
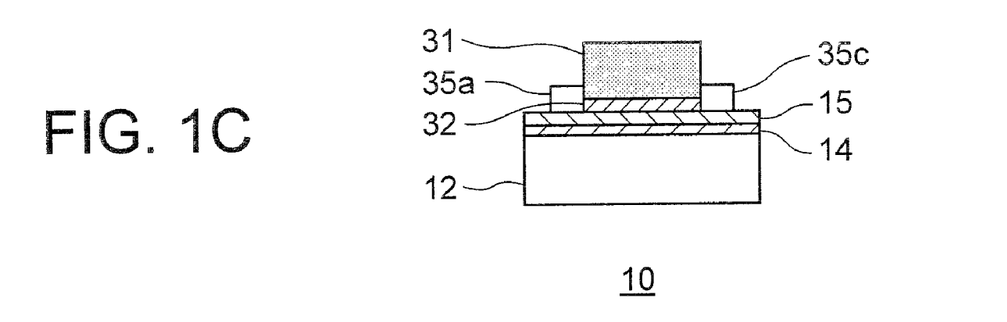
FIG. 1C is a partially enlarged view of FIG. 1B showing a structure of a mobile object and a vibration substrate.

As shown in FIG. 1A and FIG. 1B, the inertial drive actuator 10 includes a fixed member 11, piezoelectric element 21 as a displacement generating means, the mobile object 31, the vibration substrate 12 which is displaceably mounted on an intermediate plate 11e of the fixed member 11, and a guide 35 which is formed on the vibration substrate 12. Moreover, a permanent magnet 13 is disposed at a lower side of the intermediate plate 11e of the fixed member 11. One end of the piezoelectric element 21 is adjacent to an inner-side surface 11a of the rectangular frame-shaped fixed member 11. The other end of the piezoelectric element 21 is adjacent to a left-side surface 12a of the vibration substrate 12 having a rectangular shape in a plan view. It is preferable that the mobile object 31 is formed of a magnetic material or an electroconductive material.

A spring 27 is disposed to face the piezoelectric element 21 via the vibration substrate 12. In other words, one end of the spring 27 is adjacent to an inner-side surface 11d of the fixed member 11, and the other end of the spring 27 is adjacent to a right-side surface 12d of the vibration substrate 12. In the inertial drive actuator 10, when the piezoelectric element 21 elongates and the vibration substrate 12 is displaced, the spring 27 supports the vibration substrate 12, and when the piezoelectric element 21 contracts, the vibration substrate 12 is displaced to an original position by an elastic force of the spring 27. In other words, the spring 27 assists transmission of the contraction of the piezoelectric element 21 to the vibration substrate 12. Both ends of the piezoelectric element 21 and both ends of the spring 27 may be fixed to the fixed member 11 and/or the vibration substrate 12.

The guide 35 (regulating member) includes four guide members 35a, 35b, 35c, and 35d (hereinafter, 'guide members 35a to 35d') formed on the vibration substrate 12, to be protruding upward. A closed area which is surrounded by the guide members 35a to 35d and which regulates the movement of the mobile object 31 is formed on the vibration substrate 12. A distance between the guide member 35a and the guide member 35c which are facing mutually is substantially same as a width of the mobile object 31, and accordingly, the mobile object 31 is movable in the area of the guide 35, while sliding on the guide member 35a and the guide member 35c.

As shown in FIG. 1C, a vibration substrate electrode 14 is formed on an upper surface of the vibration substrate 12, and an insulating layer 15 is formed on an upper surface of the vibration substrate electrode 14. On the other hand, a mobile object electrode 32 is formed on a lower surface of the mobile object 31, facing the vibration substrate 12. Moreover, it is not shown in the diagram but, a driving circuit (driving means, driving mechanism) for applying a drive voltage for displacing the piezoelectric element 21 is connected to the piezoelectric element 21. Furthermore, a friction control circuit (a friction controlling means, friction controlling means) (not shown in the diagram) which applies a voltage for generating an electric potential difference between the mobile object 31 and the vibration substrate 12, and changes a frictional force between the vibration substrate 12 and the mobile object 31 by an electrostatic force of attraction based on this electric potential difference generated is connected to the mobile object electrode 32 and the vibration substrate electrode 14. Moreover, although the abovementioned friction controlling means is for changing the frictional force between the mobile object 31 and the vibration substrate 12 by the electrostatic force of attraction based on the electric potential difference, without restricting to this, the friction controlling means may be a means in which, some other force such as a magnetic adsorption force is used, or may be a means which changes the frictional force between the mobile object 31 and the vibration substrate 12.

According to the structure described above, when the drive voltage is applied to the piezoelectric element 21, the vibration substrate 12 is displaced in a direction of displacement of the piezoelectric element 21. When the vibration substrate 12 is displaced in such manner, the mobile object 31 on the vibration substrate 12 can move inside the guide 35 by inertia.

Next, an operation of the inertial drive actuator 10 of the abovementioned structure will be described below by referring to FIG. 2A to FIG. 2C, and FIG. 3A to FIG. 3C.

Figure 2A:
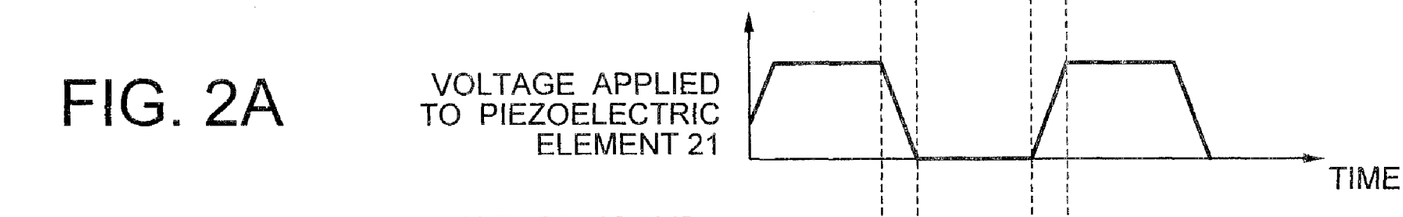
FIG. 2A, FIG. 2B, and FIG. 2C (hereinafter, 'FIG. 2A to FIG. 2C') are graphs showing driving waveforms in a case of moving the mobile object according to the first embodiment in an upward-left direction in FIG. 1A.
Figure 2B:
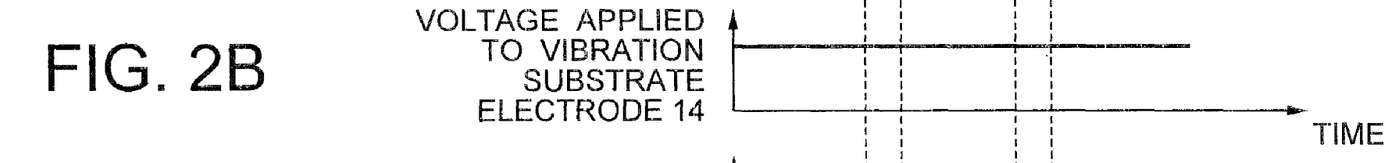
Figure 2C:
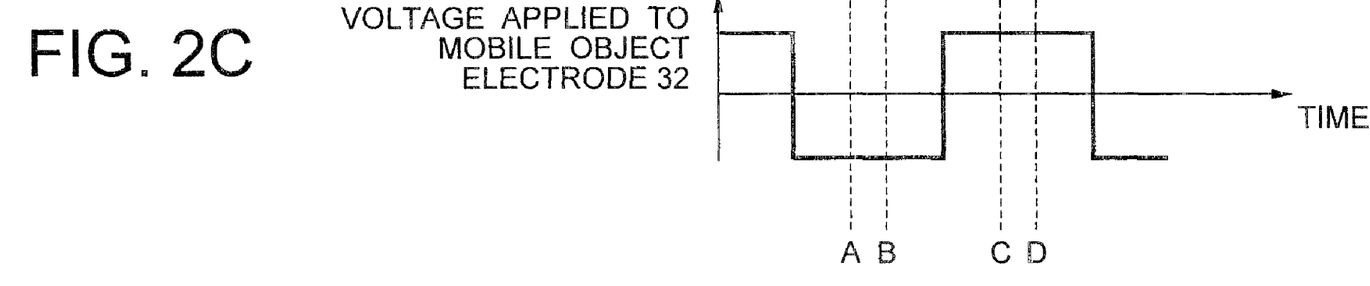

Firstly, a case in which, the mobile object 31 is moved toward upward-left will be described while referring to FIG. 2A to FIG. 2C. Here, diagrams from FIG. 2A to FIG. 2C are graphs showing driving waveforms in the case of moving the mobile object 31 in the upward-left direction in FIG. 1A, where, FIG. 2A is a graph showing a voltage applied to the piezoelectric element 21, FIG. 2B is a graph showing a voltage applied to the vibration substrate electrode 14, and FIG. 2C is a graph showing a voltage applied to the mobile object electrode 32. In the following description, in an initial state, the mobile object 31 is let to be disposed at a substantial center of an area determined by the guide 35.

Between a point of time A and a point of time B shown in FIG. 2A to FIG. 2C, a waveform applied to the piezoelectric element 21 by a driving circuit not shown in the diagram falls steeply (FIG. 2A), and the piezoelectric element 21 adjacent to the left-side surface 12a of the vibration substrate 12 contracts rapidly, and the vibration surface 12 moves rapidly in a leftward direction. On the other hand, between the point of time A and the point of time B, an electric potential difference is generated between a voltage applied to the vibration substrate electrode 14 provided on the vibration substrate 12 (FIG. 2B), and a voltage applied to the mobile object electrode 32 provided on the mobile object 31 (FIG. 2C) by an electric potential generating means not shown in the diagram. Therefore, an electrostatic adsorption force acts between the vibration substrate 12 and the mobile object 31, and the frictional force increases during this period. Consequently, the mobile object 31 also moves in the leftward direction together with the displacement of the vibration substrate 12.

Whereas, between a point of time C and a point of time D in the diagrams from FIG. 2A to FIG. 2C, conversely, a waveform applied to the piezoelectric element 21 rises steeply, and with the piezoelectric element 21 displacing rapidly in a rightward direction, the vibration substrate 12 is also displaced rapidly in the rightward direction. At this time, the voltage applied to the vibration substrate electrode 14 of the vibration substrate 12 and the voltage applied to the mobile object electrode 32 of the mobile object 31 are let to be the same electric potential. Therefore, the electrostatic adsorption force is not generated between the vibration substrate 12 and the mobile object 31. Consequently, due to the inertia of the mobile object 31, the mobile object 31 stays at that position. However, the mobile object 31 disposed at the substantial center of a space determined by the guide 35 moves in the upward-left direction along the guide members 35a and 35c on the vibration substrate 12 which has displaced with the displacement of the piezoelectric element 21.

By repeating a movement from the point of time A to the point of time B, and a movement from the point of time C to the point of time D as described above, the mobile object 31 moves in the upward-left direction with respect to the vibration substrate 12.

Figure 3A:
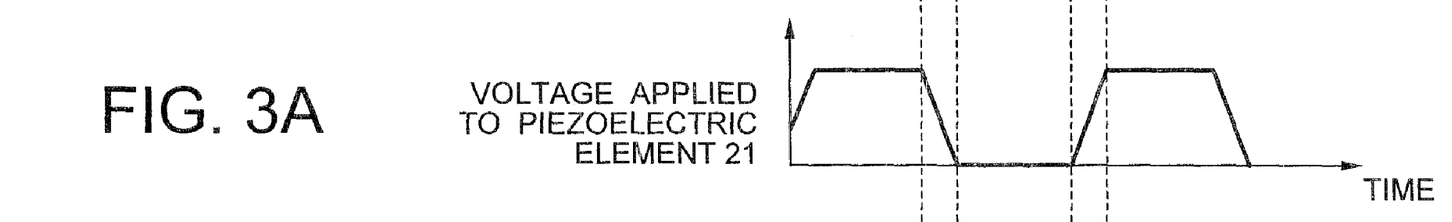
FIG. 3A, FIG. 3B, and FIG. 3C (hereinafter, 'FIG. 3A to FIG. 3C') are graphs showing driving waveforms in a case of moving the object according to the first embodiment in a downward-right direction in FIG. 1A.
Figure 3B:
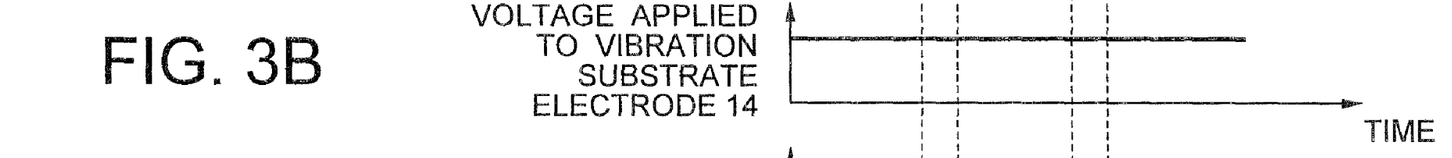
Figure 3C:
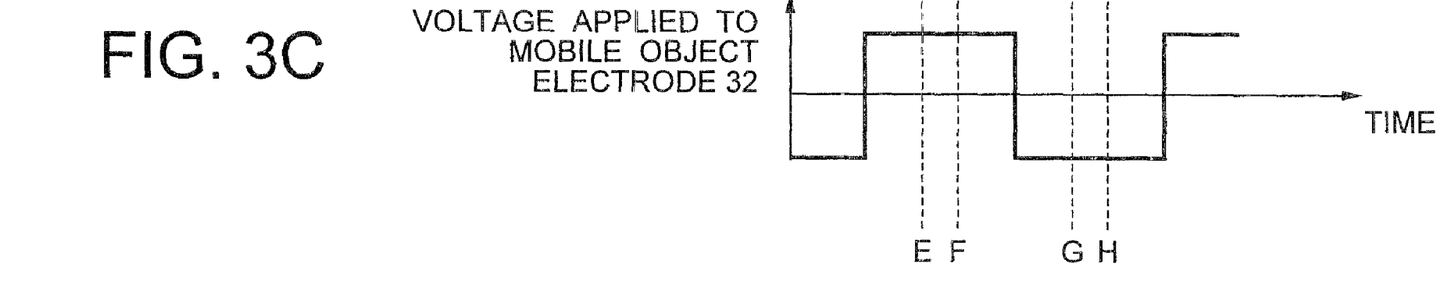

Next, a case in which, the mobile object 31 is moved in a downward-right direction will be described below by referring to the diagrams from FIG. 3A to FIG. 3C. Here, the diagrams from FIG. 3A to FIG. 3c are waveform diagrams showing driving waveforms in the case of moving the mobile object 31 in the downward-right direction in FIG. 1A, where, FIG. 3A is a graph showing a voltage applied to the piezoelectric element 21, FIG. 3B is a graph showing a voltage applied to the vibration substrate electrode 14, and FIG. 3C is a graph showing a voltage applied to the mobile object electrode 32. In the following description, in an initial state, the mobile object 31 is let to be (is assumed to be) disposed at the substantial center of the area determined by the guide 35.

Between a point of time E and a point of time F shown in FIG. 3A to FIG. 3C, a waveform applied to the piezoelectric element 21 falls steeply (FIG. 3A), and the piezoelectric element 21 contracts rapidly and the vibration substrate 12 moves rapidly in a leftward direction. On the other hand, from the point of time E up to the point of time F, the voltage applied to the vibration substrate electrode 14 provided to the vibration substrate 12 (FIG. 3B) and the voltage applied to the mobile object electrode 32 provided to the mobile object 31 (FIG. 3C) is let to be the same electric potential. Therefore, the electrostatic adsorption force is not generated between the vibration substrate 12 and the mobile object 31. Consequently, due to the inertia of the mobile object 31, the mobile object 31 stays at that position. However, the mobile object 31 disposed at the substantial center of the space determined by the guide 35 moves in the downward-right direction along the guide members 35a and 35c on the vibration substrate 12 which has displaced with the displacement of the piezoelectric element 21.

Whereas, between a point of time G and a point of time H in the diagrams from FIG. 3A to FIG. 3C, conversely, the waveform applied to the piezoelectric element 21 rises steeply, and with the piezoelectric element 21 displacing rapidly in the rightward direction, the vibration substrate 12 is also displaced rapidly in the rightward direction. During this period, an electric potential difference is generated between the voltage applied to the vibration substrate electrode 14 of the vibration substrate 12 and the voltage applied to the mobile object electrode 32 of the mobile object 31. Therefore, the electrostatic adsorption force acts between the vibration substrate 12 and the mobile object 31, and the frictional force increases. Consequently, with the displacement of the vibration substrate 12, the mobile object 31 also moves in the rightward direction.

By repeating a movement from the point of time E to the point of time F, and a movement from the point of time G to the point of time H as described above, the mobile object 31 moves in the downward-right direction with respect to the vibration substrate 12.

As it has been described above, in spite of the vibration substrate 12 being displaced only in the direction of displacement of the piezoelectric element 21, the mobile object 31 can move in the direction of the displacement of the vibration substrate 12 or a direction different from the direction of displacement, in other words, in a plane which includes these directions. Moreover, since the movement of the mobile object 31 is regulated by the guide 35, it can move in a desired trajectory even without having a position detecting mechanism, and it is possible to lower the cost.

By setting the frictional force between the guide 35 and the mobile object 31, it is possible to move the mobile object 31 while rotating. Concretely, for instance, it is possible to set the frictional force between the guide 35 and the mobile object 31 by the following structure.

(1) Forming concavities and convexities on a side surface of the guide 35 which is in contact with the mobile object 31.

(2) Making an angle made by a direction of extension of each member of the guide 35 and a direction of vibration of the vibration substrate 12 close to a right angle.

(3) Letting a planar shape of the mobile object 31 to be a polygonal shape or a circular shape.

(4) Forming concavities and convexities on the side surface of the mobile object 31.

Figure 4A:
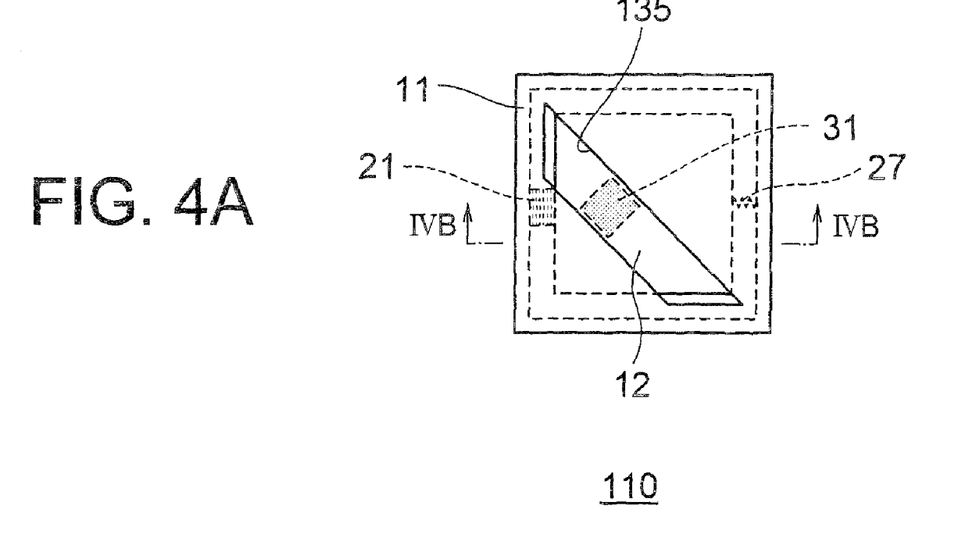
FIG. 4A is a plan view showing a structure of an inertial drive actuator according to a modified embodiment of the first embodiment.
Figure 4B:
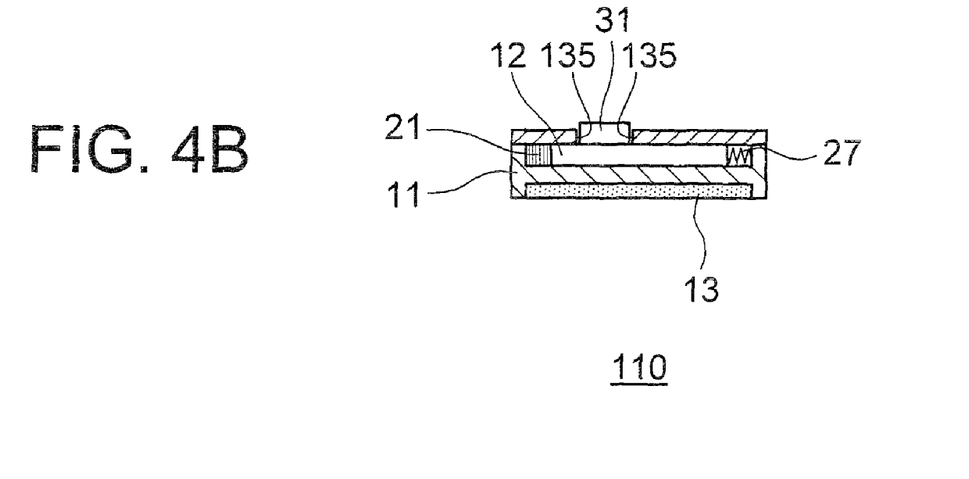
FIG. 4B is a cross-sectional view taken along a line IVB-IVB in FIG. 4A.

In the inertial drive actuator 10 according to the first embodiment, the guide 35 is provided on the vibration substrate 12. However, as in an inertial drive actuator 110 shown in FIG. 4, a guide 35 may be provided on the fixed member 11 and not on the vibration substrate 12. In this case, by generating the electrostatic adsorption force between the vibration substrate 12 and the mobile object 31 to synchronize with the elongation and contraction of the piezoelectric element 21, it is possible to move the mobile object 31 along that guide member 135 while making a contact with the guide member 135. Here, FIG. 4A is a plan view showing a structure of the inertial drive actuator 110 according to a modified embodiment of the first embodiment, and FIG. 4B is a cross-sectional view taken along a line IVB-IVB in FIG. 4A.

(Second Embodiment)

Figure 5A:
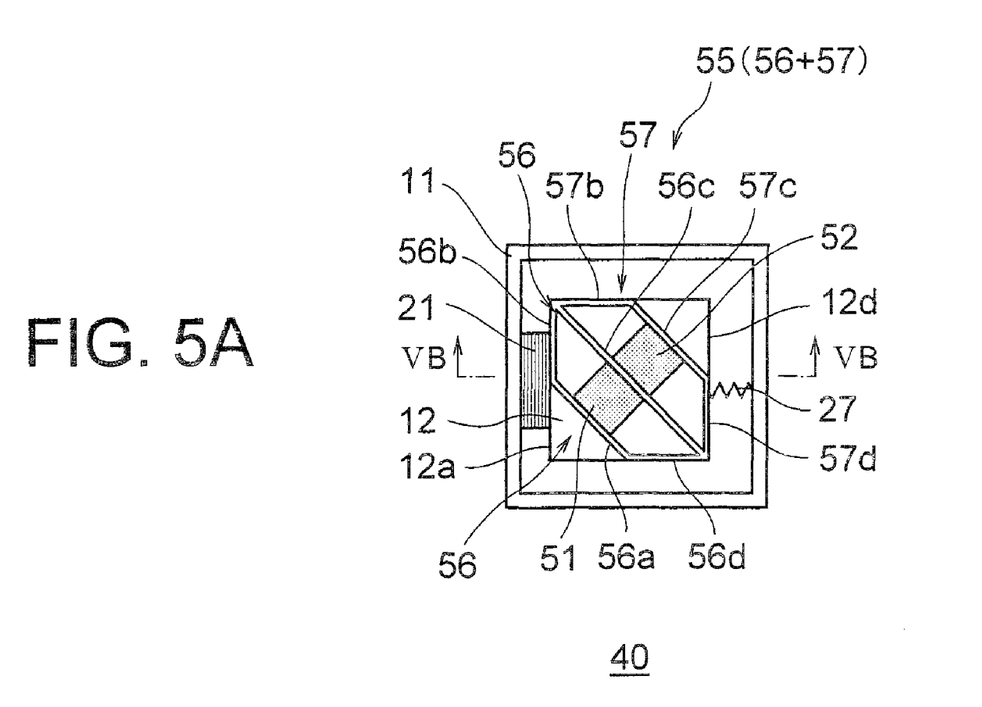
FIG. 5A is a plan view showing a structure of an inertial drive actuator according to a second embodiment.
Figure 5B:
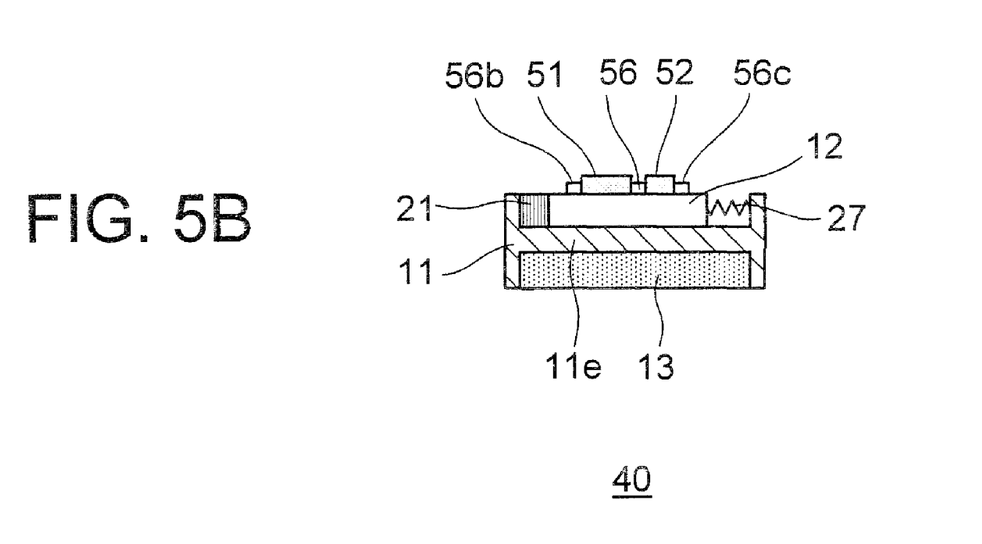
FIG. 5B is a cross-sectional view taken along a line VB-VB in FIG. 5A.

Next, an inertial drive actuator 40 according to a second embodiment will be described below while referring to FIG. 5A and FIG. 5B. FIG. 5A and FIG. 5B are diagrams showing a structure of the inertial drive actuator 40 according to the second embodiment, where, FIG. 5A is a plan view and FIG. 5B is a cross-sectional view taken along a line VB-VB in FIG. 5A.

As shown in FIG. 5A, the inertial drive actuator 40 includes two mobile objects 51 and 52. Moreover, the inertial drive actuator 40 includes a guide 55 (regulating member) which includes a plurality of guide members formed to be protruded (projected) upward on the vibration substrate 12. An area 56 is formed by four guide members 56a, 56b, 56c, and 56d out of these guide members. Moreover, an area 57 is formed by the guide member 56a of the area 56 and three guide members 57b, 57c, and 57d. The rest of the structure is similar to the inertial drive actuator 10 according to the first embodiment, and same reference numerals are assigned to members which are same as in the first embodiment.

In the area 56, a distance between the guide member 56a and the guide member 56c which are mutually facing is substantially same as a width of the mobile object 51, and accordingly, the mobile object 51 is movable in the area 56 while sliding on the guide member 56a and the guide member 56c. Moreover, in the area 57, a distance between the guide member 56c and the guide member 57c which are mutually facing is substantially same as a width of the mobile object 52, and accordingly, the mobile object 52 is movable in the area 57 while sliding on the guide member 56c and the guide member 57c.

In the inertial drive actuator 40, the vibration substrate 12 is displaced by displacing the piezoelectric element 21 similarly as in the inertial drive actuator 10. Furthermore, similarly as for the mobile object 31 of the inertial drive actuator 10, by applying a voltage to mobile object electrodes (not shown in the diagram) of the mobile objects 51 and 52, it is possible to control an electrostatic force of attraction between the mobile objects 51 and 52, and the vibration substrate 12. Accordingly, it is possible to move the mobile objects 51 and 52 in desired directions in the area 56 and the area 57.

It is possible to control independently the voltage to be applied to the mobile objects 51 and 52. Consequently, it is possible to move the mobile object 51 and the mobile object 52 independently. It is also possible to dispose a plurality of mobile objects in the area 56 and/or the area 57. The rest of the structure, action, and effect are similar as in the first embodiment.

Figure 6A:
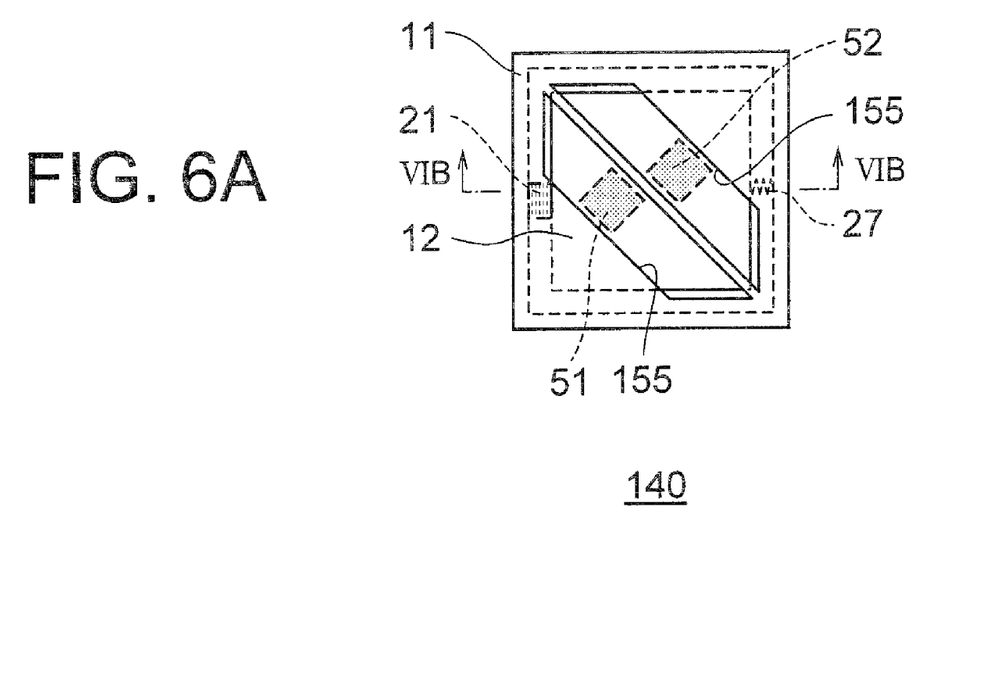
FIG. 6A is a plan view showing a structure of an inertial drive actuator according to a modified embodiment of the second embodiment.
Figure 6B:
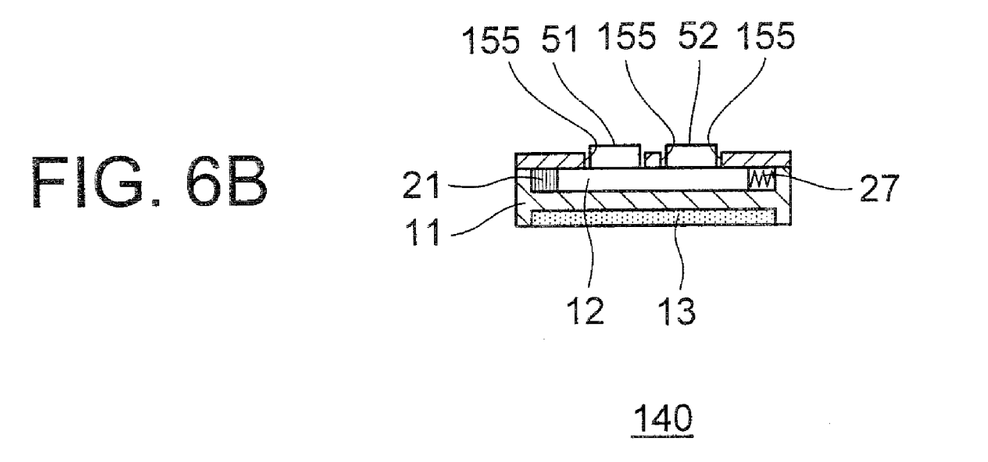
FIG. 6B is a cross-sectional view taken along a line VIB-VIB in FIG. 6A.

Moreover, in the inertial drive actuator 40 according to the second embodiment, the guide 55 is provided on the vibration substrate 12. However, as in an inertial drive actuator 140 shown in FIG. 6, a guide 155 may be provided on the fixed member 11 and not on the vibration substrate 12. In this case, by generating the electrostatic adsorption force between the vibration substrate 12 and the mobile objects 51 and 52 to synchronize with the elongation and contraction of the piezoelectric element 21, it is possible to move the mobile objects 51 and 52 along the guide member 155 while making a contact with the guide member 155. Here, FIG. 6A is a plan view showing a structure of the inertial drive actuator 140 according to a modified embodiment of the second embodiment, and FIG. 6B is a cross-sectional view taken along a line VIB-VIB in FIG. 6A.

(Third Modified Embodiment)

Figure 7:
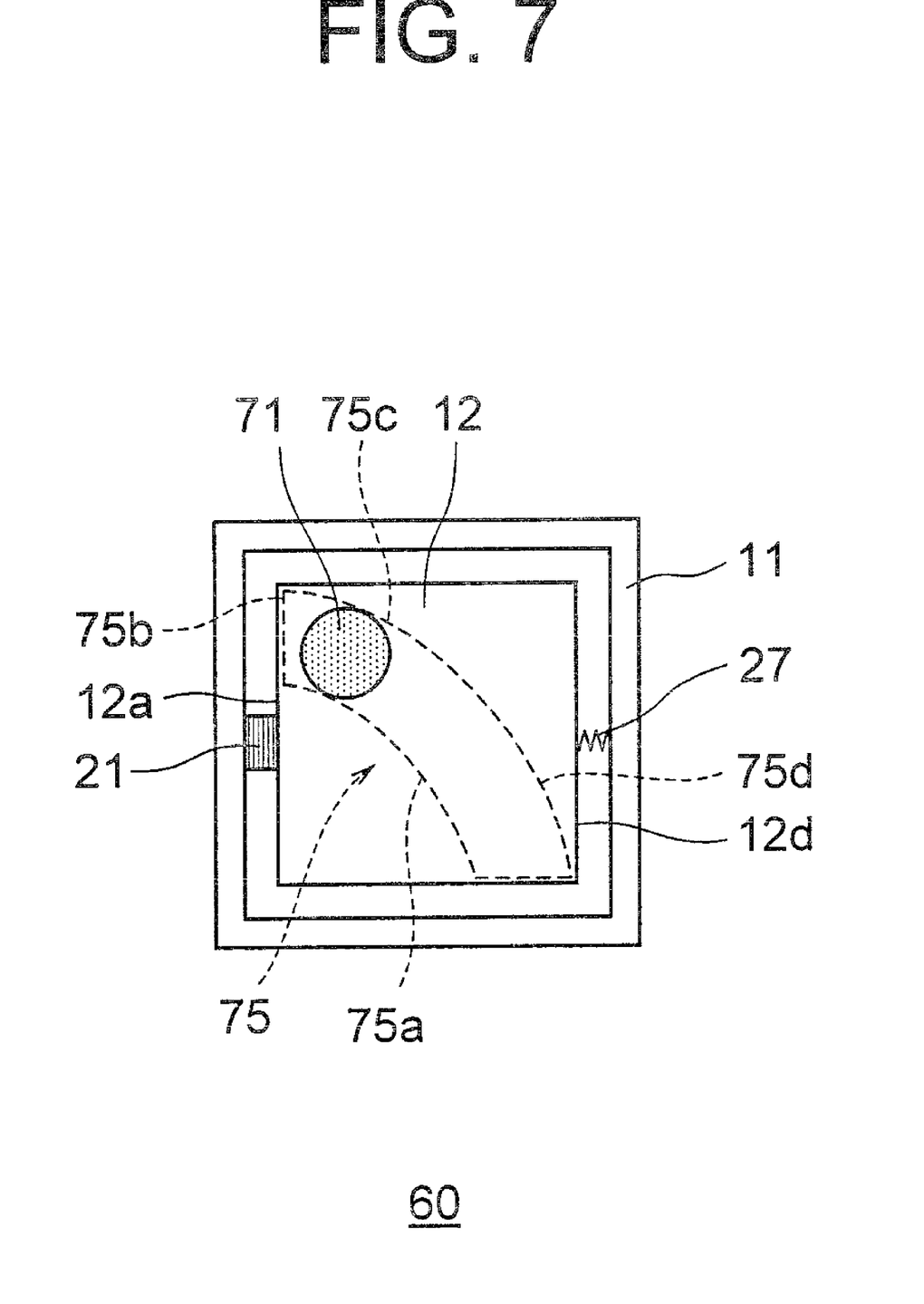
FIG. 7 is a plan view showing a structure of an inertial drive actuator according to a third embodiment.

Next, an inertial drive actuator 60 according to a third embodiment will be described below by referring to FIG. 7. FIG. 7 is a plan view showing a structure of the inertial drive actuator 60 according to the third embodiment.

As shown in FIG. 7, the inertial drive actuator 60 includes a guide 75 (regulating member) made of a plurality of guide members formed to be protruded upward on the vibration substrate 12. The guide 75 includes mutually facing circular arc shaped guide members 75a and 75c, and guide members 75b and 75d which are connected to the guide members 75a and 75c respectively, and forms an area which is closed by these guide members. A distance between the guide member 75a and the guide member 75c is substantially same as an outer diameter of a circular cylindrical shaped mobile object 71 and accordingly, the mobile object 71 is movable in the area of the guide 75 while sliding on the guide member 75a and the guide member 75c. The rest of the structure is similar to the inertial drive actuator 10 according to the first embodiment, and same reference numerals are assigned to members which are same as in the first embodiment.

In the inertial drive actuator 60, the vibration substrate 12 is displaced by displacing the piezoelectric element 21 similarly as in the inertial drive actuator 10. Furthermore, similarly as for the mobile object 31 of the inertial drive actuator 10, by applying a voltage to mobile object electrode (not shown in the diagram) of the mobile object 71, it is possible to control an electrostatic force of attraction between the mobile object 71 and the vibration substrate 12. Accordingly, it is possible to move the mobile object 71 in a desired direction in the area of the guide 75.

The guide 75 is not restricted to a straight line as in the inertial drive actuator 10 according to the first embodiment and the inertial drive actuator 40 according to the second embodiment, and moreover may be let to be an arbitrary curve other than a circular arc shape of the guide members 75a and 75c. Furthermore, a combination of a straight line and a curve is also possible. Since it is possible to select arbitrarily the guide shape in such manner and to move the mobile object along the guide members which form the guide, it is possible to move a mobile object 71 in a desired trajectory.

The rest of the structure, action, and effect are similar as in the first embodiment.

Figure 8:
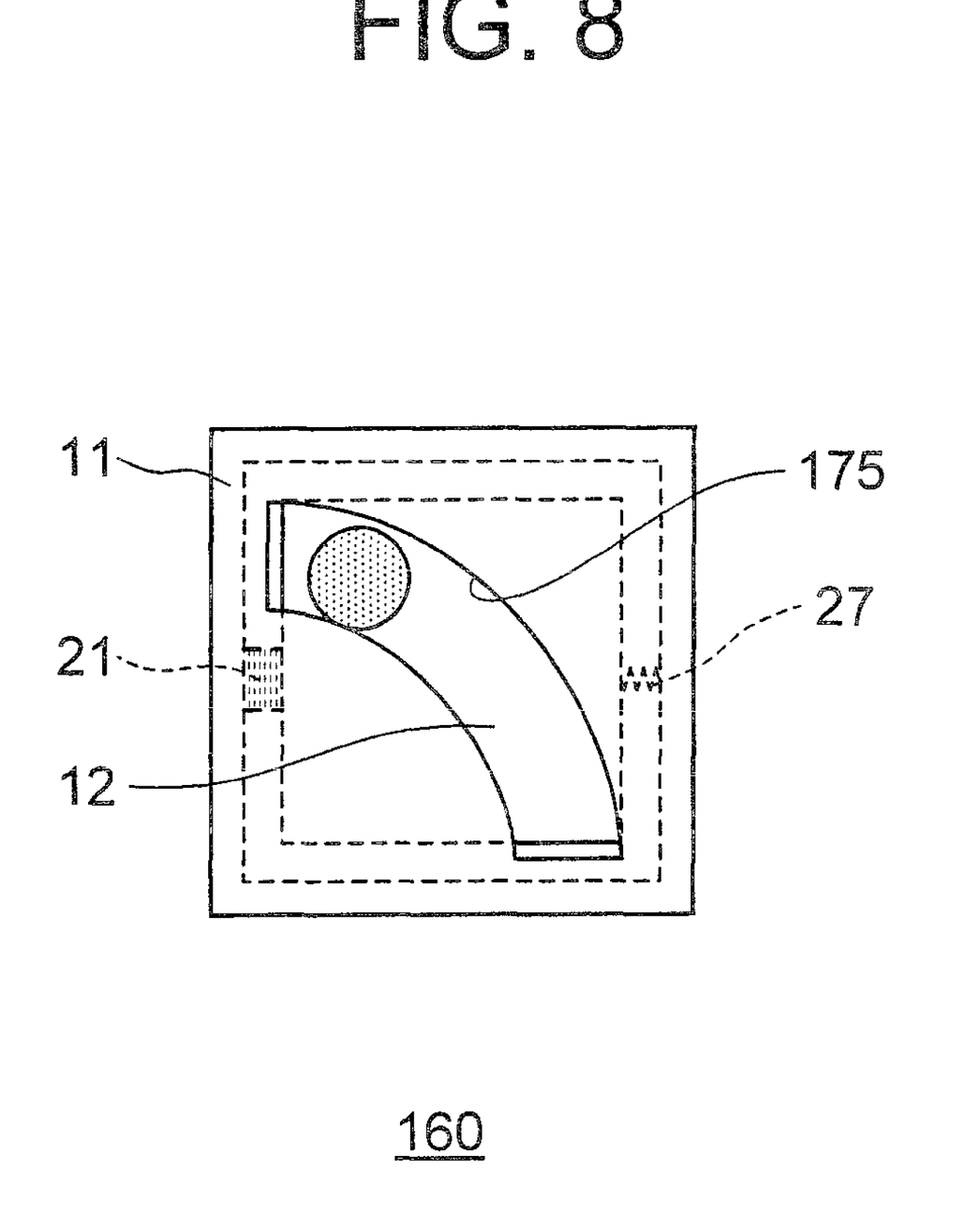
FIG. 8 is a plan view showing a structure of an inertial drive actuator according to a modified embodiment of the third embodiment.

In the inertial drive actuator 60 according to the third embodiment, the guide 75 is provided on the vibration substrate 12. However, as in an inertial drive actuator 160 shown in FIG. 8, a guide 175 may be provided on the fixed member 11 and not on the vibration substrate 12. Here, FIG. 8 is a plan view showing a structure of the inertial drive actuator 160 according to a modified embodiment of the third embodiment.

(Fourth Embodiment)

Figure 9:
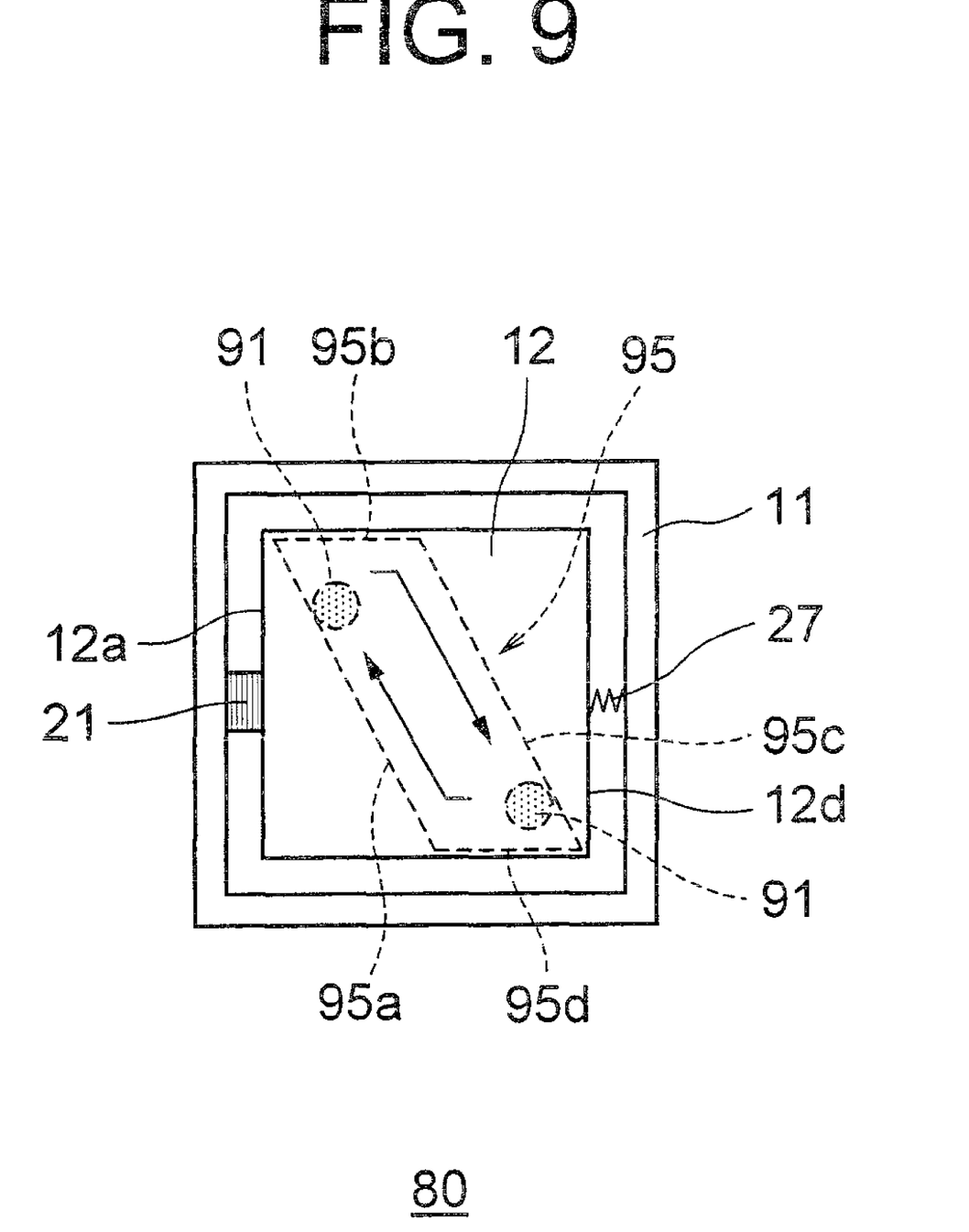
FIG. 9 is a plan view showing a structure of an inertial drive actuator according to a fourth embodiment.

Next, an inertial drive actuator 80 according to a fourth embodiment will be described below by referring to FIG. 9. FIG. 9 is a plan view showing a structure of the inertial drive actuator 80 according to the fourth embodiment.

As shown in FIG. 9, the inertial drive actuator 80 includes a mobile object 91 and a guide 95 (regulating member) made of a plurality of guide members formed to be protruded upward on the vibration substrate 12. The guide 95 includes four guide members 95a, 95b, 95c, and 95d, and forms an area which is closed by these guide members. The rest of the structure is similar to the inertial drive actuator 10 according to the first embodiment, and same reference numerals are assigned to members which are same as in the first embodiment.

In the guide 95, a distance between the guide member 95a and the guide member 95c which are face-to-face is more than an outer diameter of a mobile object 91.

In the inertial drive actuator 80, the vibration substrate 12 is displaced by displacing the piezoelectric element 21 similarly as in the inertial drive actuator 10. Moreover, similarly as for the mobile object 31 of the inertial drive actuator 10, by applying a voltage to a mobile object electrode (not shown in the diagram) of the mobile object 91, it is possible to control an electrostatic force of attraction between the mobile object 91 and the vibration substrate 12. Accordingly, it is possible to move the mobile object 91 in a desired direction in the area of the guide 95. Furthermore, since it is also possible to move the mobile object 91 not along each guide member of the guide 95, a movement having a hysterisis as shown by arrows in FIG. 9 is possible.

It is also possible to dispose a plurality of mobile objects in a distance of the guide 95. In this case, it is possible to control independently the voltage to be applied to each mobile object. Consequently, it is possible to move each mobile object independently.

The rest of the structure, action, and effect are similar as in the first embodiment.

Moreover, in the inertial drive actuator 80 according to the fourth embodiment, the guide 95 is provided on the vibration substrate 12. However, as shown in an inertial drive actuator 180 shown in FIG. 10, a guide 195 may be provided to be intersecting with the guide 95, on the fixed member 11 and not on the vibration substrate 12. Moreover, instead of the guide 95 provided on the vibration substrate 12, the guide 195 provided on the fixed member 11 may be used. Here, FIG. 10 is a plan view showing a structure of the inertial drive actuator 180 according to a modified embodiment of the fourth embodiment.

Figure 10:
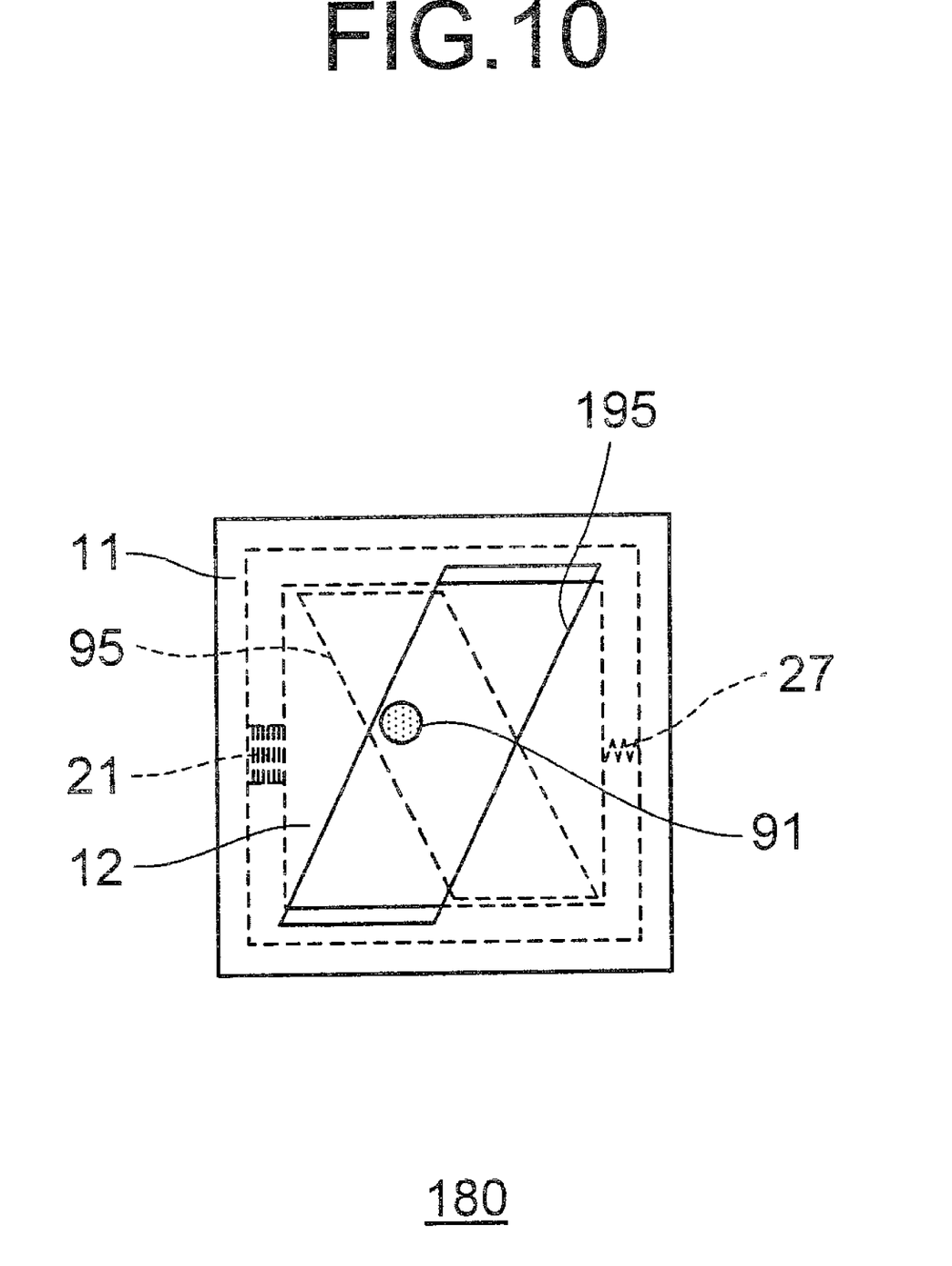
FIG. 10 is a plan view showing a structure of an inertial drive actuator according to a modified embodiment of the fourth embodiment.

According to the structure in FIG. 10, it is possible to move the mobile object 91 while making a contact with the guide 95 and the guide 195, and it is possible to move the mobile object 91 arbitrarily in an area surrounded by the guide 95 and the guide 195.

In the embodiments described above, a mobile object electrode is formed on the mobile object. However, without restricting to this, the mobile object electrode may be formed by making the mobile object of an electroconductive material. Furthermore, by making the mobile object of a magnetic material and disposing a permanent magnet on the vibration substrate in an opposite direction of the mobile object, it is possible to hold a position of the mobile object even when the electric potential difference between the mobile object electrode and the vibration substrate electrode is eliminated.

As it has been described above, the inertial drive actuator according to the present invention is useful for a small-size equipment in which, it is necessary to displace the object minutely.

The inertial drive actuator according to the present invention shows an effect that it is possible to move the mobile object in a desired direction in XY plane, and to move the mobile object in a desired trajectory without complicating the structure.

What is claimed is:

1. An inertial drive actuator comprising:
a fixed member;
a displacement generating mechanism of which, one end is adjacent to the fixed member, and a displacement is generated at the other end thereof;
a driving mechanism which applies a voltage for displacing the displacement generating mechanism;
a vibration substrate which is connected to the other end of the displacement generating mechanism, and which is displaceable in a direction of displacement;
a mobile object which is disposed to be facing the vibration substrate, and which moves with respect to the vibration substrate by inertia; and
a friction controlling mechanism which changes a frictional force between the mobile object and the vibration substrate;
a regulating member which regulates the movement of the mobile object is provided to at least one of the fixed member and the vibration substrate; and
a closed area formed on the regulating member and extending in an a direction other than a direction of displacement of the vibration substrate, wherein
the mobile object is arranged within the closed area, and the mobile object moves along the regulating member.

2. The inertial drive actuator according to claim 1, wherein the vibration substrate has a vibration substrate electrode, the mobile object has a mobile object electrode at a position facing the vibration substrate electrode,
an insulating layer is disposed between the vibration substrate electrode and the mobile object electrode, and
the friction controlling mechanism generates an electric potential difference between the mobile object electrode and the vibration substrate electrode, and changes the frictional force between the vibration substrate and the mobile object by an electrostatic force of attraction based on the electric potential difference.

3. The inertial drive actuator according to claim 2, wherein the mobile object rotates by a frictional force with the regulating member, and a displacement of the vibration substrate.

4. The inertial drive actuator according to claim 3, wherein the mobile object is formed of an electroconductive material.

5. The inertial drive actuator according to claim 4, further comprising: a permanent magnet which is arranged on the vibration substrate on a side opposite to the mobile object, wherein the mobile object is formed of a magnetic material.

6. The inertial drive actuator according to claim 5, wherein the mobile objects are in plurality, and it is possible to control the plurality of mobile objects independently.

7. The inertial drive actuator according to claim 1, wherein the mobile object is formed of an electroconductive material.

8. The inertial drive actuator according to claim 7, further comprising: a permanent magnet which is disposed on the vibration substrate, on a side opposite to the mobile object, wherein the mobile object is formed of a magnetic material.

9. The inertial drive actuator according to claim 8, wherein the mobile objects are in plurality, and it is possible to control the plurality of mobile objects independently.

* * * * *